United States Patent
Yerton et al.

(10) Patent No.: US 10,470,438 B2
(45) Date of Patent: Nov. 12, 2019

(54) PET TOY

(71) Applicant: R2P Group, Inc., Pleasanton, CA (US)

(72) Inventors: Nicholas R. Yerton, Danville, CA (US); Barbara L. Agnew, San Diego, CA (US)

(73) Assignee: Cosmic Pet LLC, Wichita, KS (US)

( * ) Notice: Subject to any disclaimer, the term of this patent is extended or adjusted under 35 U.S.C. 154(b) by 162 days.

(21) Appl. No.: 15/599,215

(22) Filed: May 18, 2017

(65) Prior Publication Data

US 2017/0332604 A1    Nov. 23, 2017

Related U.S. Application Data

(60) Provisional application No. 62/338,430, filed on May 18, 2016.

(51) Int. Cl.
*A01K 15/02* (2006.01)

(52) U.S. Cl.
CPC ............ *A01K 15/025* (2013.01); *A01K 15/02* (2013.01)

(58) Field of Classification Search
CPC .... A01K 15/026; A01K 15/025; A01K 15/02; A01K 29/00
See application file for complete search history.

(56) References Cited

U.S. PATENT DOCUMENTS

| | | | | |
|---|---|---|---|---|
| 2,185,547 A | * | 1/1940 | Fowler | A01K 15/026 119/709 |
| 4,321,888 A | * | 3/1982 | Topliffe | A01K 15/025 119/709 |
| 4,884,807 A | * | 12/1989 | Welch | A63B 43/00 473/575 |
| 5,870,971 A | * | 2/1999 | Krietzman | A01K 15/025 119/707 |
| 7,144,293 B2 | * | 12/2006 | Mann | A01K 15/026 446/184 |

* cited by examiner

*Primary Examiner* — Trinh T Nguyen

(74) *Attorney, Agent, or Firm* — Rathe Lindenbaum LLP

(57) ABSTRACT

A pet toy may include a core and flexible line wound about the core.

20 Claims, 3 Drawing Sheets

PET TOY

CROSS-REFERENCE TO RELATED PATENT APPLICATIONS

The present application claims priority under 35 USC 119 from U.S. Provisional Patent Application Ser. No. 62/338,430 filed on May 18, 2016 by Nicholas R. Yerton et al. and entitled PET BED AND PET TOYS, the full disclosure of which is hereby incorporated by reference.

BACKGROUND

Pet toys are used to entertain pets. Pet toys may come in a variety of different forms and functions. Many of such pet toys failed to fully entertain the pet or are complex or expensive.

DETAILED DESCRIPTION OF EXAMPLES

Figure 1:
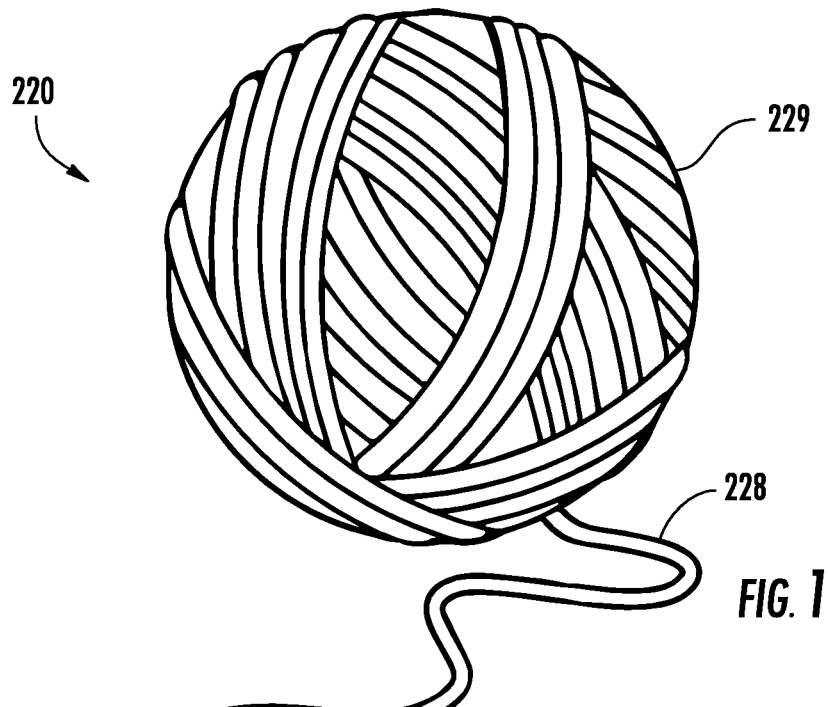
FIG. 1 is a perspective view of an example pet toy ball.
Figure 2:
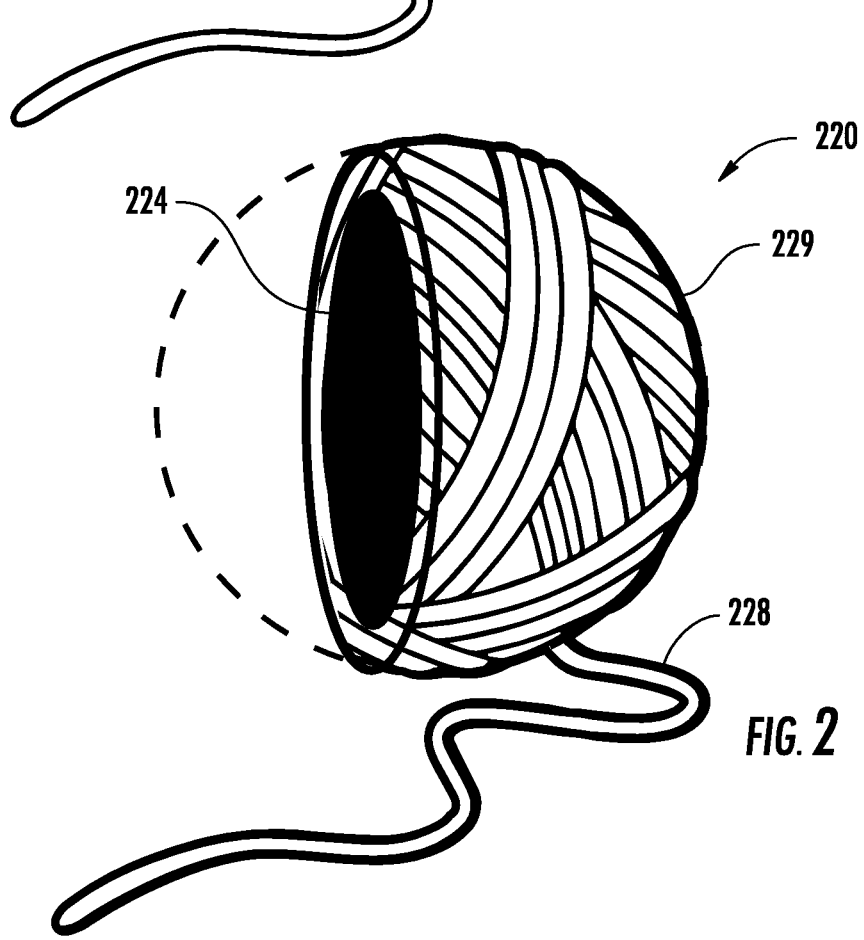
FIG. 2 is a sectional view of the example pet toy ball of FIG. 1.

FIGS. 1-2 illustrate an example pet toy ball 220. Pet toy ball 220 comprises a toy that may be rolled, grasped and played with by a pet, such as a cat. Toy 220 comprises core 224 and flexible line 228. Core 224 comprises an internal body about which flexible line 228 is wound. In one implementation, core 224 comprises a solid sphere or ball. In one implementation, core 224 comprises a lightweight ball, such as a ball formed from a foam. In another implementation, core 224 comprises a sphere or ball formed from a polymer or rubber-like material, allowing pet toy ball 220 to bounce. Although illustrated as being spherical to facilitate rolling, in other implementations, core 224 may have other shapes, wherein the windings of the flexible line 228 provide pet toy ball 220 with a spherical shape to facilitate rolling. As will be described hereafter, in other implementations, core 224 may alternatively be hollow or have internal passages.

Flexible line 228 comprises an elongate continuous strand or line of flexible material which is wound about core 224 to form a layer of windings 229. Flexible line 228 provides the ball with an uneven, non-uniform outer surface that may be easily grasped by a pet, such as a cat. In one implementation, flexible line 228 comprises yarn. In another implementation, flexible line 228 comprises a string. In one implementation, flexible line 228 comprises segments of different colors. In some implementations, flexible line 228 may comprise multiple distinct pieces of string or yarn wound about or otherwise secured to the exterior of core 224.

Flexible line 228 is wound about core 224 so as to form a layer of windings, wherein the layer of windings 229. In one implementation, the layer of windings 229 has a thickness of at least $\frac{1}{16}$th of an inch, and in another implementation, a thickness of at least $\frac{1}{8}^{th}$ to $\frac{1}{4}$ of an inch. In one implementation, flexible line 228 is wound about core 224 such that the overall diameter of the ball of toy 220 is at least 2 inches and no greater than 7 inches. In other implementations, flexible line 228 may be formed from other materials, may form a layer of windings having other thicknesses or a ball having other diameters.

In one implementation, the exterior of core 224 is coated with an adhesive prior to the whining of flexible line 228. The adhesive facilitates retention of flexible line 228 about core 224. In other implementations, flexible line 228 is wound about core 224 and tied off or tied to itself along the exterior of the layer of windings 228. In other implementations, as will be described hereafter, other mechanisms may be utilized to secure line 228 in place to prevent or inhibit unwinding.

Figure 3:
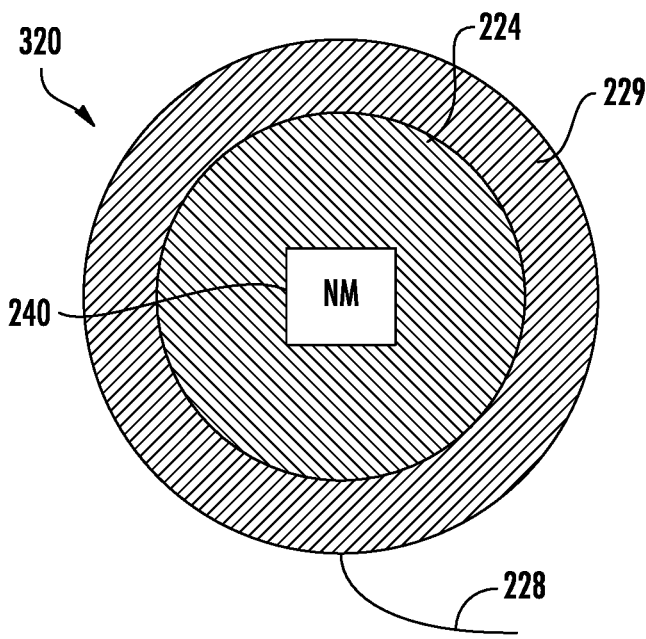
FIG. 3 is a sectional view of another example pet toy ball.

FIG. 3 is a sectional view of pet toy ball 320, a particular implementation of ball 220. Ball 320 is similar to ball 220 except that ball 320 additionally comprises a noisemaker 240 (schematically shown). Noisemaker 240 comprises a device that produces audible sound in response to movement of ball 320. In one implementation, noisemaker 240 comprises a rattle. In another implementation, noisemaker 240 comprises a bell. In the example illustrated, noisemaker 240 is embedded within core 224. In one implementation, core 224 is formed about noisemaker 240, prior to the winding up flexible line 228. In another implementation, in which core 224 is formed from a compressible or deformable material, at least prior to solidifying or curing and prior to the winding up flexible line 228, noisemaker 240 may be pressed into core 224.

Figure 4:
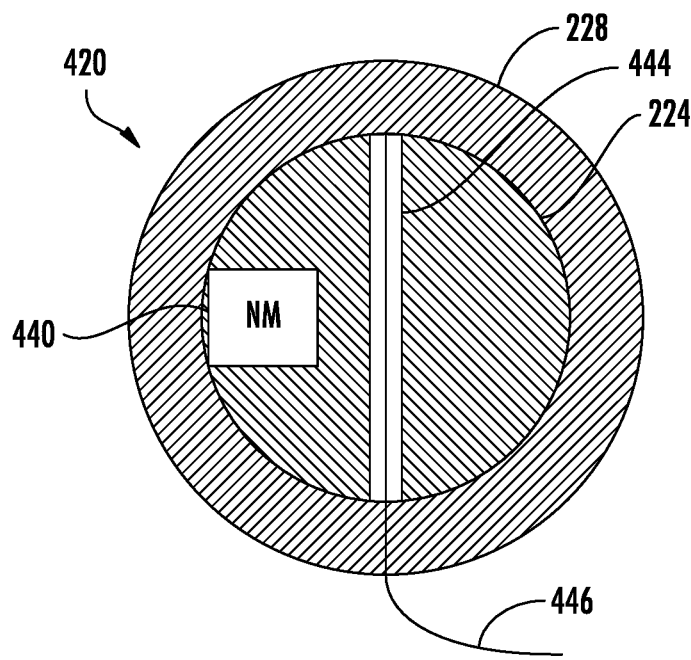
FIG. 4 is a sectional view of another example pet toy ball.

FIG. 4 is a sectional view of pet toy ball 420, another implementation of ball 220. Ball 420 is similar to ball 220 except that ball 420 comprises noisemaker 440 an internal core passage 444. In the example illustrated, core 224 is formed from a material that changes shape, deforms or separates in response to applied force. In the example illustrated, core 224 comprises a foam ball. In other implementations, core 224 may comprise other manually deformable materials. As shown by FIG. 4, noisemaker 240 is pressed into core 224 and resides along the exterior surface of core 224. Core 224 changes shape during such insertion to grip and retain noisemaker 440. In other implementations, noisemaker 440 may be coated with an adhesive during such depressant into core 224.

Internal core passage 444 comprises a passage extending through core 224. In the example illustrated, flexible line 228 extends from the exterior of core 224 through passage 444. Passage 444 assists in retaining and securing flexible line 228 and the windings of flexible line 228 about core 224. In the example illustrated, flexible line 228 comprises a tail 446 hanging from ball 420, wherein the remaining length of flexible line 228 passes through passage 444 and is wound about core 224. As a result, pulling upon tail 446 is not result in flexible line 228 being unwound.

Figure 5:
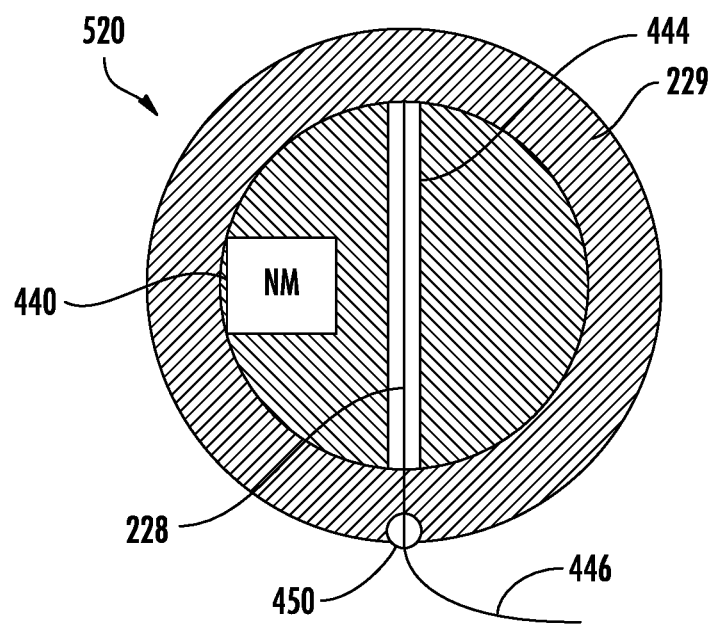
FIG. 5 is a sectional view of another example pet toy ball.

FIG. 5 is a sectional view of ball 520, another implementation of ball 220. Ball 520 is similar to ball 420 described above except that flexible line 228 has a first end portion forming a loop 450 proximate to the exterior of windings of line 228. The same line 228 has a second end portion that passes through passage 444 and through loop 450 to further assist in securing tail 446 without unwinding of line 228.

Figure 6:
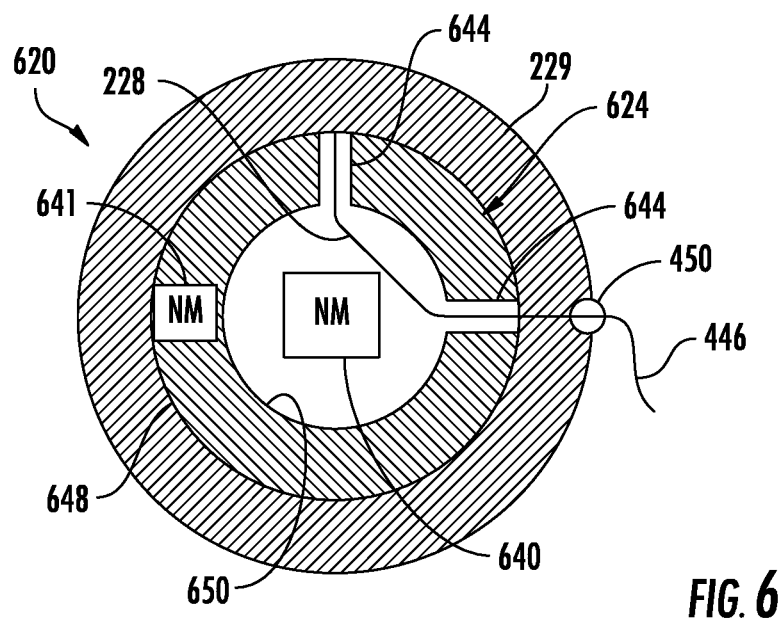
FIG. 6 is a sectional view of another example pet toy ball.

FIG. 6 is a sectional view of ball 620, another implementation of ball 220. Ball 620 is similar to ball 520 except that ball 620 comprises core 624 in place of core 224, comprises passages 644 in place of passage 444 and comprises noisemakers 640, 641 in place of noisemaker 440. Those remaining components of ball 620 which correspond to ball 520 are numbered similarly.

Core 624 is similar to core 224 except that core 624 comprises a hollow core having a wall 648 and a hollow interior 650. Wall 648 extends about interior 650. In one implementation, wall 648 supports noisemaker 641 which may be embedded or formed in wall 648. In the example illustrated, hollow interior 650 contains noisemaker 640 which is similar to noisemaker 240 described above. In one implementation, noisemaker 640 freely moves within interior 650. In another implementation, noisemaker 640 is adhered or otherwise secured in place within interior 650. In some implementations, one or both of noisemakers 640, 641 may be omitted. In yet other implementations, ball 620 may comprise additional noisemakers. Noisemaker 640, 641 are similar to noisemaker 240 and 440 described above, but for their locations.

Passages 644 are similar to passage 444 except the passages 644 extend through different portions of wall 648. As with line 228, line 228 of ball 620 has a first end portion forming a loop 450 proximate to the exterior of windings of line 228. The same line 228 has a second end portion that passes through passage 444 and through loop 450 to further assist in securing tail 446 without unwinding of line 228. In some implementations, passages 644 may be omitted.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A pet toy comprising:
    a core;
    flexible line wound about the core, wherein the flexible line repeatedly extends completely around the core with a first winding of the flexible line overlapping and directly contacting a second winding underlying the first winding.

2. The pet toy of claim 1 further comprising a noise maker in the core.

3. The pet toy of claim 2, wherein the core has a hollow interior and wherein the noise maker is within the hollow interior.

4. The pet toy of claim 2, wherein the noisemakers embedded within a solid portion of the core.

5. The pet toy of claim 2, wherein the noisemaker comprising noisemaker selected from noisemakers consisting of a rattle and a bell.

6. The pet toy of claim 1, wherein the core is hollow.

7. The pet toy of claim 1, wherein the core is solid.

8. The pet toy of claim 1, wherein the core comprises foam.

9. The pet toy of claim 1, wherein the core comprises a foam ball.

10. The pet toy of claim 1, wherein innermost windings of the flexible line are adhered to the core.

11. The pet toy of claim 1, wherein the flexible line passes through the core.

12. The pet toy of claim 1, wherein the flexible line is tied to itself.

13. The pet toy of claim 1, wherein the flexible line passes through the core, the flexible line having a first end portion forming a loop and a second end portion passing through the loop.

14. The pet toy of claim 1, wherein the flexible line comprises yarn.

15. The pet toy of claim 1, wherein the first winding extends alongside and contacts a third winding formed by the flexible line.

16. The pet toy of claim 15, wherein the third winding extends alongside and contacts a fourth winding formed by the flexible line, wherein the first winding, the third winding and the fourth winding each overlap and directly contact the second winding which underlies the first winding, the third winding and the fourth winding.

17. The pet toy of claim 16, wherein the flexible line further forms a fifth winding underlying the second winding, wherein the fifth winding, the first winding and the second winding at different oblique angles about the core.

18. The pet toy of claim 17, wherein the first winding, the second winding and the third winding each extend 360° about the core and have different lengths.

19. The pet toy of claim 11, wherein the first winding extends alongside and contacts a third winding formed by the flexible line.

20. The pet toy of claim 19, wherein the third winding extends alongside and contacts a fourth winding formed by the flexible line, wherein the first winding, the third winding and the fourth winding each overlap and directly contact the second winding which underlies the first winding, the third winding and the fourth winding.

* * * * *